June 15, 1965   C. L. LOVERCHECK   3,188,753
ANATOMICAL DEVICE
Filed June 13, 1963   2 Sheets-Sheet 2
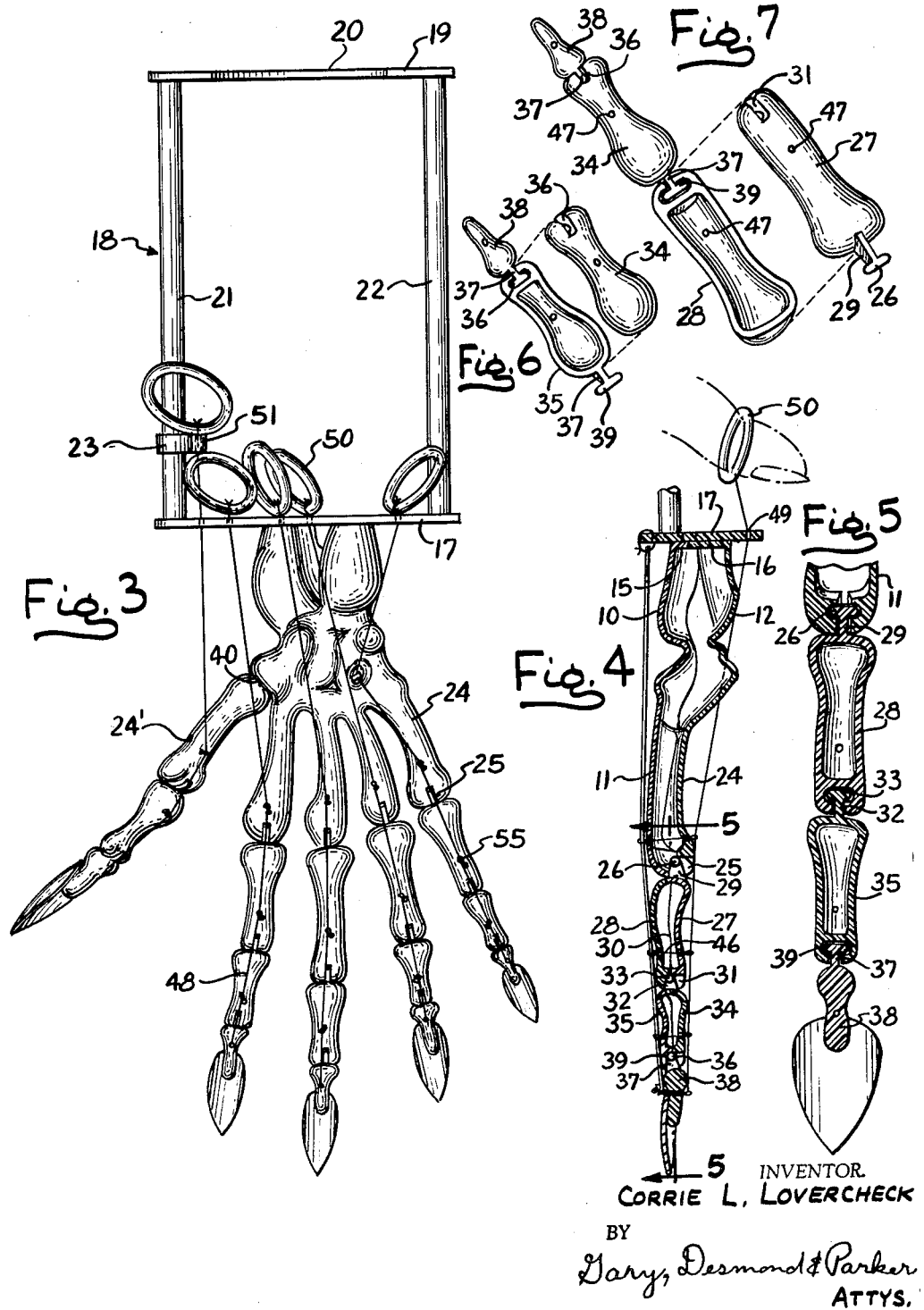
INVENTOR.
CORRIE L. LOVERCHECK
BY
Gary, Desmond & Parker
ATTYS.

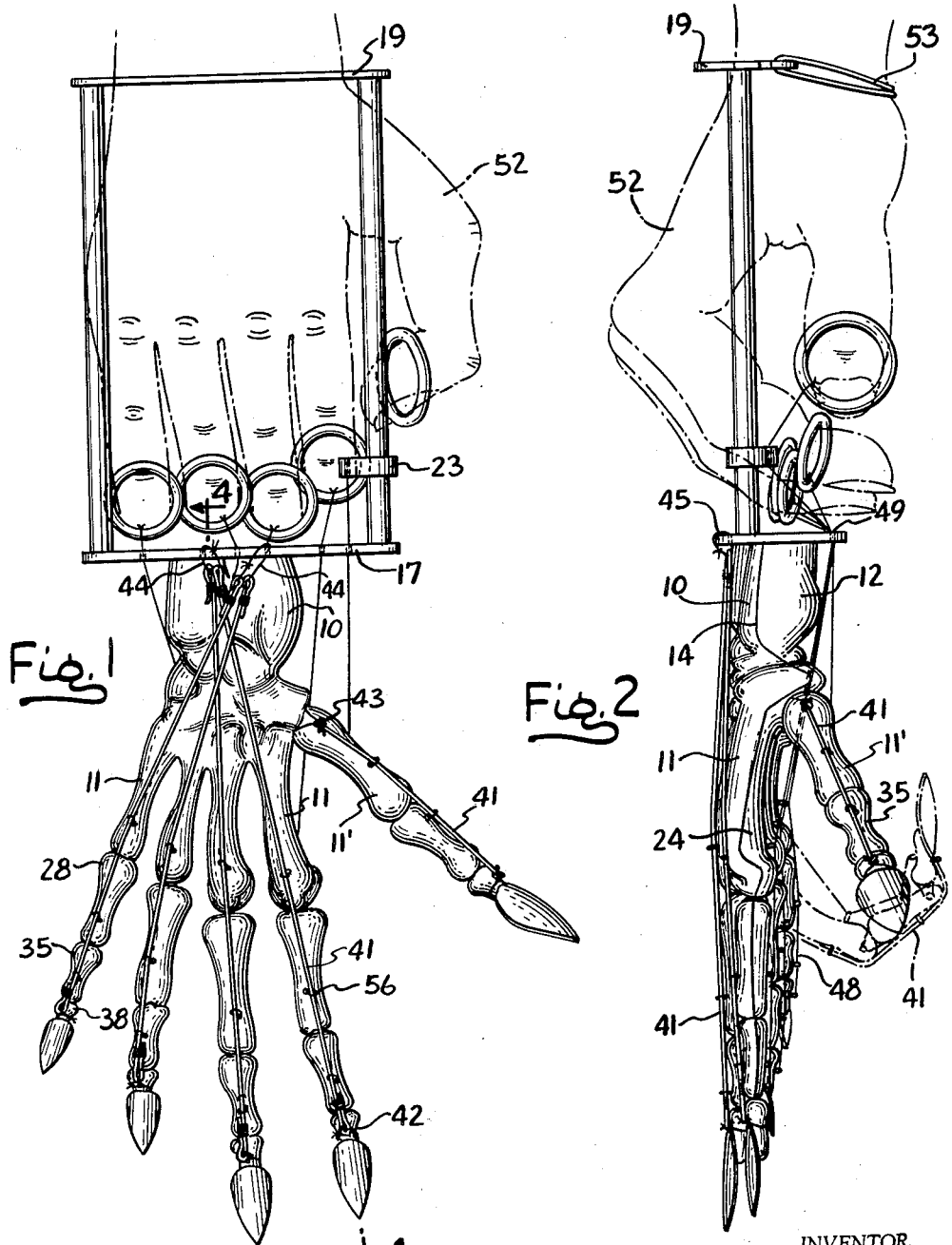

United States Patent Office 3,188,753
Patented June 15, 1965

3,188,753
ANATOMICAL DEVICE
Corrie L. Lovercheck, Deaver, Wyo., assignor to Superior Plastics Inc., Chicago, Ill., a corporation of Delaware
Filed June 13, 1963, Ser. No. 287,614
1 Claim. (Cl. 35—17)

This invention relates to a novel anatomical device, and more particularly to a simulated human hand skeleton composed of a plurality of assembled components of rigid synthetic resinous or plastic material which can be supplied as a kit, and adapted for educational and amusement purposes and as a model demonstrating the contours and components of the said skeletal members.

It is an object of the present invention to provide a skeletal member as aforesaid whereof the finger components are in hinged articulated engagement, together with means for animating the same in a controlled manner whereby the fingers can be controlled in movement either individually or as a group to simulate life movement.

It is a further object of the present invention to provide a mounting means or bracket for supporting the assembled human hand skeleton as aforesaid and for ease in animation thereof.

Other objects and advantages of the present invention relate to its details of construction and arrangement of parts which will be apparent from a consideration of the following specification and accompanying drawings, wherein:

FIG. 1 is a dorsal or back side view of a simulated human hand skeleton and supporting bracket of the present invention.

FIG. 2 is a side elevational view thereof.

FIG. 3 is a palm view of a simulated human hand skeleton and supporting bracket of the present invention.

FIG. 4 is a section of the line 4—4 of FIG. 1.

FIG. 5 is a fragmentary section on the line 5—5 of FIG. 4.

FIGS. 6 and 7 are exploded or partial assembly views of the human hand phalange skeletal components of the present invention.

Referring to the drawings, the reference numeral 10 indicates a simulated wrist bone portion of the human hand skeleton viewed from the dorsal side and formed integrally with the simulated metacarpals 11. The portions 10 and 11 are integral and molded in one piece with outer contours defining the various wrist bone components such as trapezium, scaphoid, trapezoid, os magnum, semi-lunar, unciform, cuneiform, and pisiform. The dorsal side portions 10 and 11 are provided as a separate piece in a kit which is assembled by means of the companion palm side portions 12 and 24. These are joined together by adhesive on the line 14. The base of the wrist bone portion 10-12 are, for the purposes which will be hereinafter more fully explained in detail, adhesively united by means of their integral end portions 15 and 16 to the platform component 17 of the bracket generally indicated at 18. This bracket further comprises the wrist plate 19 formed with an arcuate cut-out portion 20 to conform to the wrist of a wearer, the portions 17 and 19 being spaced by means of the rods 21, 22 completing the bracket. The bracket further has engaged on the rod 21 the slidable member 23, the use of which will be later explained.

The palm side 24 of the metacarpals of their outer free ends are each formed with a slot of approximately 90° arc lying essentially in the palm side as indicated at 25. Between the metacarpal components 11-24 adjacent the slot 25 there is further provided a transverse pocket which receives a hinged component 26 integral with the flat shank member 29 which is in turn integral with the palm side phalange component 27. This component 27 is completed on the dorsal side by the phalange component 28. The phalange 27-28 is thus articulated with the metacarpal 11-24 with movement of the said phalange permitted with respect to the said metacarpal in a limited manner; that is, limited from substantial alignment as shown in FIG. 4, to a palm direction as indicated by the dotted lines in FIG. 2, in simulated natural hand-closure or grasping-hand movement by actuating means which will be hereinafter described.

The phalange components 27-28 are of course adhesively united along the line 30. The phalange component 27, at its end opposed to the axially extending shank 29, is formed with a 90° slot 21 similar to the slot 25 for receiving the flat shank 32 and above it the transverse component 33 in a socket formed in one of the adjacent phalange components. The hinged shank component 31 is integral with one of the next adjacent adhesively united phalange components 34-35 one of these components at the opposed end also being formed with a slot 36 receiving the flat shank 37 of the phalange 38. The shank 37 is, of course, also provided with a transverse member 39 for pivotal reception in a companion seat or pocket in the phalange components 35-34.

FIGS. 6 and 7 show exploded and assembly details of the phalange components which have just been described and thus, as previously indicated, while each of the two palm side phalange components 27 and 34 are provided with 90° slots 31 and 36 respectively, the palm side phalange component has its hinged components 26 and 29 integral with it at its base end, whereas the flat hinge 37 and transverse pin 39 are integral with the dorsal side phalange component 35.

Although the articulated phalange components and the articulation with one of the metacarpals has been described in detail it will be understood that the foregoing is equally applicable to the other three fingers.

As for the thumb, the metacarpal component 24'-11' may be adhesively and fixedly joined to the simulated wrist bone arrangement as at 40 and thus there will be only two movable thumb phalanges which are similar to the previously described outermost phalange 38 and the adjacent or intermediate phalange 34-35, the latter being articulated with the metacarpal 24'-11' by means of the slots at the outer extremity thereof as previously described with respect to the remaining fingers. In other words, the thumb is the same as the other four fingers as far as the present invention is concerned with the exception that one phalange equivalent to the previously described phalange 27-28 is omitted, and the numbering will therefore be considered to be the same for the similar parts.

For the purpose of animation, there is secured to each of the fingers digitally extending elastic cords 41, each anchored at one end as at 42 to the outermost phalange and at the opposed end, in the case of the thumb, to the joint between the wrist and metacarpal as at 43, and the remaining ones at some suitable point either on the wrist 10 or suitably on the bracket member 17 by tying as indicated at 44 with the aid if desired of added tie members 45 which extend through apertures in the bracket base member 17. These elastic cord members 41 are additionally anchored to the various phalanges by means of tie members such as at 46 which extend through corresponding apertures as indicated at 47 in the phalange components. These tie members 46 terminate in loops 56 which freely and slidably receive the elastic members 41. By means of these elastic members the phalanges are urged to the dorsal side limits of the slots to cause the hand skeleton to be outstretched or fully opened.

Closing of the hand or selected fingers or the thumb thereof is manually accomplished by means of the inelastic cords digitally extending on the palm side of the hand skeleton. Thus, as appears from the palm side of FIG. 3, an inelastic cord 48 is secured at one end to each terminal phalange 38, the opposed ends of the cords extending through apertures such as at 49 in the bracket platform 17 whereat they are secured to suitable manipulation members such as the rings 50 adapted to receive the finger of an operator. These inelastic cords 48 are slidably secured on the palm side within loops 55 which are opposed to the previously described elastic cord receiving loops 56 on tie members 46.

The inelastic cord which is secured to the thumb for ease of manipulation may further pass through axially apertured portion 51 of the member 23 which is slidably secured to the bracket rod 21 for better location and ease in manipulation of the skeletal thumb by means of the hand of a human operator as indicated by the dotted hand 52. As shown in FIGS. 1 and 2, the bracket may be engaged to the wrist of a wearer by disposing thereover the bracket portion 19 having the cut-out or arcuate portion 20, and with the aid of the wrist tie loop 53.

Thus, by engagement of the fingers of the wearer in the rings or loops 50 the phalanges of the simulated hand skeleton can be manipulated to move them on their joints against the action of the elastic cords 41 which tend to hold the hand open.

When thus properly assembled, the components, which are originally in knock-down kit form, can be controlled in movement just as in life and the hand made to grasp, hold, pick up and control objects in substantially life-like manner. In use, by means of the bracket, the assembly may be tied to the wrist of a wearer and his sleeve disposed over his hand so that only the skeleton remains exposed, which can then be manipulated from concealed position.

Although I have shown and described the preferred embodiment of my invention, it will be understood by those skilled in the art that changes may be made in the details thereof without departing from its scope as comprehended by the following claim.

I claim:

An anatomical model composed of a plurality of assembled components of rigid synthetic resinous material comprising a simulated human hand skeleton, including simulated metacarpals rigidly secured to a unitary simulated palm section, and separate simulated phalanges in articulated engagement with said metacarpals simulating the fingers of said hand skeleton, a mounting bracket for said hand skeleton comprising a platform secured to its said palm section, and means anchored and adjacent to said platform for animating said articulated phalanges in a manually controlled manner, comprising digitally extending elastic means anchored at one end adjacent to said platform and at the opposed end to each finger tip phalange, and slidably retained therebetween on the dorsal side of each of said articulated finger components to normally urge said fingers to extended open hand position, and digitally extending lanyards slidably engaged to said finger components on their palm sides and anchored at one end to their finger tip phalanges, said lanyards, at their opposed ends, extending through apertures formed in said platform and secured thereat to manual manipulating means whereby said fingers can be individually flexed against the tension of said elastic means.

References Cited by the Examiner

UNITED STATES PATENTS

| 276,231 | 4/83 | Doyle | 294—25 |
| 1,375,809 | 4/21 | Armstrong | 3—12.7 |
| 2,472,819 | 6/49 | Giesen | 35—17 |
| 2,549,074 | 4/51 | Fishbein et al. | 3—12.7 |
| 2,659,896 | 11/53 | Biasi | 3—12.7 |
| 2,733,545 | 2/56 | Guadagna | 3—12.7 X |
| 2,847,678 | 8/58 | Opuszenski | 3—12.7 |

FOREIGN PATENTS 667,906   3/52   Great Britain.

OTHER REFERENCES

Clay-Adams Catalogue (1949), pp. 142 and 144 relied on. (Copy in Class 35, Library R 717.C6, 1949.)

JEROME SCHNALL, *Primary Examiner.*